United States Patent [19]

Rosenblatt

[11] 4,108,938

[45] Aug. 22, 1978

[54] METHOD FOR SHAPING A PLASTIC MEMBRANE

[75] Inventor: Solomon Rosenblatt, Montclair, N.J.

[73] Assignee: Johnson & Johnson, New Brunswick, N.J.

[21] Appl. No.: 706,793

[22] Filed: Jul. 19, 1976

[51] Int. Cl.² ............................................. B27J 5/00
[52] U.S. Cl. .................................. 264/127; 264/295; 264/316; 264/339
[58] Field of Search ............... 264/286, 295, 316, 322, 264/325, 339, DIG. 66, 127

[56] References Cited

U.S. PATENT DOCUMENTS

| 1,587,462 | 6/1926 | Adams | 264/316 |
|---|---|---|---|
| 3,497,256 | 2/1970 | Rosenblatt | 264/41 X |

*Primary Examiner*—Thomas P. Pavelko
*Attorney, Agent, or Firm*—Ostrolenk, Faber, Gerb & Soffen

[57] ABSTRACT

A membrane of a porous unexpanded polytetrafluoroethylene (PTFE), such as that made by the matrix technique disclosed in U.S. Pat. No. 3,497,256, issued Feb. 24, 1970, in sheet form is sandwiched between metal foil layers that are stiff enough to take a dead set crimp; the three layer composite is passed through corrugating gears; the corrugated composite is indexed between two grooved plates under moderate pressure and the composite is heated while between the plates to heat set the plastic membrane; then the metal foil layers are removed after cooling.

13 Claims, 3 Drawing Figures

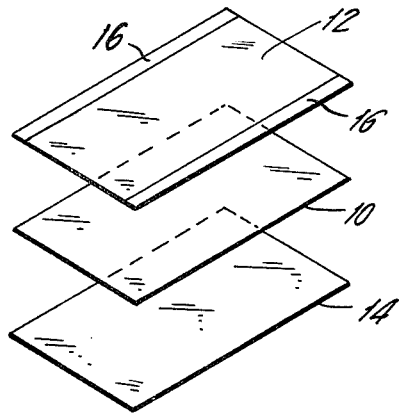
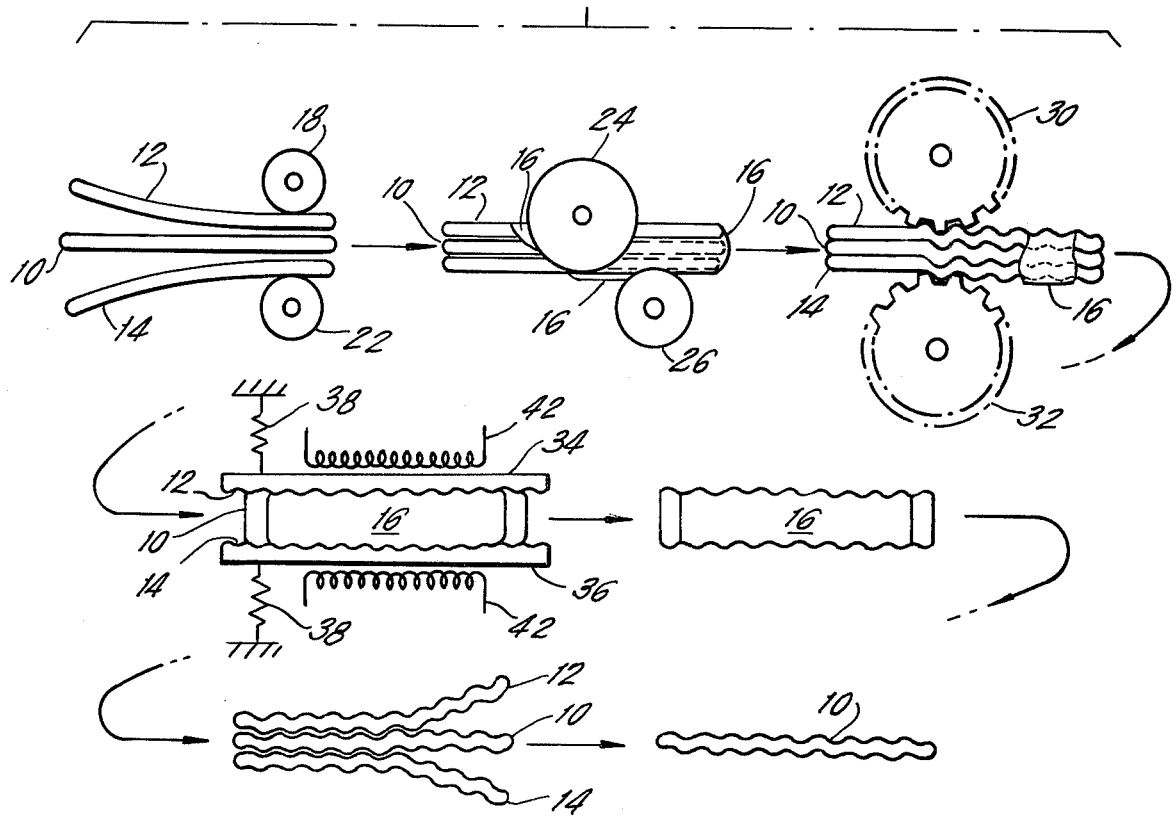

METHOD FOR SHAPING A PLASTIC MEMBRANE

BACKGROUND OF THE INVENTION

This invention relates to the shaping of a membrane, particularly a plastic membrane and more particularly a porous unexpanded polytetrafluoroethylene (PTFE), such as that made by the matrix technique disclosed in U.S. Pat. No. 3,497,256, issued Feb. 24, 1970.

A porous membrane permits passage of material through it proportional to its open pore volume. Also, the larger the surface area of a membrane, the greater is the quantity of material that the membrane can pass. Frequently, a membrane spans a limited area. To increase the effective surface area of the membrane within the confined area, it is conventional to pleat, corrugate or otherwise reshape the membrane to be other than flat in cross section. Thus, a greater functional surface area section of the membrane is used to span the confined area than would be the case were the membrane flat. In addition, in certain applications, the membrane must be shaped, e.g. pleated, corrugated, or the like to generate certain mixing or flow patterns in liquids or gases that flow past one or both surfaces of the membrane.

Various techniques for causing a membrane to be non-flat, shaped, corrugated, etc. are presently practiced. The membrane could be initially extruded through a corrugating die, or molded, or cast in a mold. Dies and molds can be quite expensive. But, it is much less expensive to obtain plastic film in large commercial quantities in flat sheet form than it is to extrude or mold unusually shaped plastic membranes.

SUMMARY OF THE INVENTION

The present invention is adaptable for use in connection with matrix membranes of any unstretched thermoplastic polymer having suitable physical characteristics. However, it is most suitable for use in connection with a selective barrier. e.g., a porous membrane, and for the purpose of increasing the effective transfer area of the membrane over a particular confined area span. The invention has particular application to porous unstretched membranes of PTFE.

Through practicing the present invention, a plastic membrane is precisely preformed to the corrugated, or the like, pattern of its ultimate support plate by means of a shaping operation that is performed remote from the support plate. Hereafter, a PTFE porous membrane will be discussed. However, it should be understood that other membranes capable of accepting and of reacting in the desired manner to the treatment recited herein may be employed.

An unstretched porous PTFE sheet produced by the aforesaid matrix technique, in its preoxidized or its oxidized form, is sandwiched between two protective layers forming what hereafter will be referred to as a composite. The protective layers are still enough to hold a crimp but they are not so stiff as to be springy or to crack upon being sharply creased or corrugated. In accordance with a preferred technique in the practice of the invention, the composite is heated. It is thus preferably for the outer protective layers to be heat transmitting. In the preferred arrangement, the outer layers are comprised of thin metal sheets which may be foil thin in certain applications.

The outer layers, particularly when comprised of metal foil, have the following functions and advantages. They prevent stretching of the membrane during corrugation of the composite. This maintains the original pore size of the PTFE membrane. They protect the surfaces of the membrane against marring or abrasion during corrugation and handling. They tend to smooth out the membrane surface. The outer layers help set and maintain a corrugation pattern for themselves and for the underlying membrane until subsequent heat setting. The outer layers act as heat transfer surfaces during the heat setting. The outer layers also act as a protective wrap for the membrane pending final assembly of the membrane onto its ultimate support plate.

Following assembly of the three layers of the composite, the three layer composite is secured together against relative movement of one layer with respect to the other layers and preferably with the adjacent layers in substantial facewise engagement.

Then the three layer composite has forces applied to it to reshape the entire composite in a desired manner, specifically for the purpose of reshaping the membrane. In a preferred embodiment, the composite is passed between corrugating rollers or gears or other appropriate deforming means whose teeth pattern or surface profile is designed to cause the composite to develop a predetermined cross sectional profile. For example, if the membrane is to be carried on a support plate, the surface profile that will be developed will index precisely with the profile of the membrane support plate.

The ability of the three layer composite to conform to the desired corrugated shape without tension or stress being applied to the membrane is dependent upon how evenly the composite is pleated, i.e. how even is the depth of the pleats on each side or how evenly the composite is pleated across its full extent and on both surfaces. If the corrugation or pleating is not uniform and has discontinuities or creases, a curved stressed structure will result.

In addition, various surface profiles can be impressed upon the membrane for generating selected primary and secondary flow patterns in fluids passing over the membrane surfaces. This can enhance the efficiency with which fluids are mixed on the membrane surface.

After the initial corrugation or shaping, the multilayer composite is acted upon to permanently set the membrane in its reshape condition. The composite is placed between plates. The plates are preferably grooved to conform to the established pattern of corrugations, or the like. The outer layers are indexed into the pattern of the plates. In some applications of the invention, the application of moderate pressure to the external surfaces of the composite may be required. Heat setting is a preferred technique for thermoplastic membranes. Heat setting is effected by heating the grooved plates. This in turn heats the outer protective layers and then the membrane, all of which are sandwiched between the plates. The heat is applied for a period sufficient to soften the membrane so that it might conform to its new corrugated shape. The heat setting device still containing the composite is allowed to cool. The cooled composite is removed from the plates. The outer layers of the composite may then be removed and discarded. A permanently corrugated or shaped membrane of unstretched PTFE has been produced that is adapted to index precisely with a correspondingly shaped support plate.

Because the membrane is formed remote from its ultimate installation, e.g. in a factory, membrane quality can be much better controlled than if the membrane were shaped in situ. Also, a preshaped membrane can be affixed to its support plate with much less adhesive than one that has been shaped in situ, thereby reducing the quantity of pore occluding adhesives that must be used and eliminating the membrane surface contamination and possible pore blockage that accompanies in situ shaping procedures.

Accordingly, it is the primary object of the present invention to produce a shaped membrane.

It is a further object of the invention to produce a shaped membrane that conforms to a precise pattern.

It is another object of the invention to shape the membrane with minimum effort and with minimum changes in the characteristics of or damage to the membrane.

It is still another object of the invention to provide a surface profile to a membrane to affect the flow patterns of fluids in contact with the membrane surface.

It is a further object of the invention to shape the membrane at a location remote from its ultimate installation, for ensuring better quality control, for example.

It is yet another object of the invention to accomplish the foregoing with unstretched PTFE membranes.

These and other objects of the invention will be apparent from the foregoing summary of the invention and from the following detailed description of the invention taken in conjunction with the accompanying drawings.

BRIEF DESCRIPTION OF THE DRAWINGS

FIG. 1 is an exploded perspective view of a three layer composite, including a membrane, prior to its being shaped in accordance with the invention;

FIG. 2 is a schematic flow diagram showing the process according to the invention;

FIG. 3 schematically illustrates one application of a membrane shaped in accordance with the process of this invention.

DETAILED DESCRIPTION OF A PREFERRED EMBOCIMENT

FIG. 1 illustrates one embodiment of a composite used in connection with the invention. A porous membrane 10 in sheet form and comprised of PTFE is formed according to the process disclosed in U.S. Pat. No. 3,497,256. The membrane is in the range of from 1 mil to 30 mils or about 0.25 mm. to 7.5 mm. in thickness. It is porous, with sufficient pores to permit gas, and particularly oxygen, to permeate through the membrane, the minimum porosity being on the order of 40%.

Modifications in the material of membrane 10 bring about certain desired thermoforming properties. For example, by blending a lower softening point thermoplastic, e.g. a fluorinated ethylene propylene copolymer, which is compatible with the PTFE to form a "mixed resin", formation and heat setting of the resulting membrane can be accomplished at a lower temperature, by means of the heat setting procedure described below. The use of these resins, separately or in mixtures, also may enhance the stiffness of the membrane, change its surface properties or provide easier bonding to other structures, if that is desired.

Sheet membrane 10 is longer than its ultimate span or cross-section length, as the cross-section length of the membrane will be considerably shortened by the below described corrugation step.

Both above and below sheet membrane 10 are located metallic protective layers 12, 14, each of a thickness on the order of 2 mils to 10 mils or about 0.5 mm. to 2.5 mm. This thickness is selected, in accordance with the characteristics of the metal used to make the layers, so that the layers 12, 14 are stiff enough to hold a crimp or corrugation, but not so stiff as to be springy or to crack upon being sharply creased. In the preferred form, the layers 12, 14 are comprised of a metal foil, for instance of stainless steel. Layers 12 and 14 are at least as large in surface area as layer 10, so as to completely cover layer 10. In addition, layer 12 is wider than layer 14, such that layer 12 is provided with border regions 16 of, for example, approximately ¼ inch or about 6 mm. in width along its opposed edges. By the procedure described below, the border regions 16 are folded past the membrane 10 and are crimped around and securely against the outside of layer 14 for holding the composite three layer assembly securely together during the subsequent steps in the process now to be described.

Referring to the schematic flow diagram of FIG. 2, the PTFE membrane 10 and the metal foil layers 12 and 14 are all fed from respective supplies (not shown). They are passed between rollers 18, 22 which bring the three layers into contact with each other and which cooperate in aligning the three layers for the next forming operation.

The three layer composite is now secured together to prevent relative motion of any of its layers. To accomplish this, the composite is passed between a first forming roller set comprised of two rollers 24 on opposite sides of the composite layers 10, 12 and 14 (one roller 24 being shown). The rollers 24 are spaced apart such that they are positioned beyond the edges of layers 10, 14. But, they intercept the border portion 16 of layer 12 and, in accordance with conventional forming roller design, they bend the border portions 16 downwardly past the layers 10 and 14. The three layer composite next passes a second crimping roller set comprised of two rollers 26 on opposite sides of the three layer composite (one roller 26 being shown). Rollers 26 are so shaped and positioned as to crimp the border layer 16 and fold same under layer 14, whereby a complete three layer composite has been formed with the PTFE membrane 10 securely protected between the outer layers.

The composite now has forces applied to it to reshape it in a manner which reshapes the membrane as desired. In the preferred embodiment, the composite moves between a pair of corrugating rollers 30, 32, which are at least as wide as the entire composite 10, 12, 14. Both of rollers 30, 32 have corrugations or teeth extending across their entire width. By means of rollers 30, 32, the composite is corrugated across its entire width. The teeth or corrugations on roller 30 are shaped and spaced matingly and correspondingly to the teeth and corrugations on the other roller 32 and the rollers 30, 32 are so oriented that a projection on one of these rollers projects toward and pushes the composite into a cooperating depression in the other roller. The teeth pattern of rollers 30, 32 duplicate the pitch, frequency and spacing of the profile of the support plate to which the completed membrane 10 is ultimately affixed (as in FIG. 3). The corrugation or teeth pattern on rollers 30, 32 also take into account the thickness of the foil layers 12, 14 and the coefficient of expansion during subsequent treatment of the now shaped assembly.

The ability of the corrugated composite to conform in a tension free configuration is dependent upon how evenly the corrugated depressions are created across the width of the composite layers. If the corrugations are not uniform across the width, a curved, stressed structure will result.

Although simple corrugations and rollers shaped for creating them are illustrated, it is apparent that other surface patterns may be imposed upon the composite depending upon the pattern applied to the rollers 30, 32 or applied to shaping plates, if that is the technique used for deforming and shaping the composite. Other patterns might include diamond or other geometrical shapes or convolutions. The shape of the membrane created by the profiled rollers has a profound effect on the transfer characteristics of the reshaped membrane 10. it is desirable in many situations, such as the example described below in conjunction with FIG. 3, to fluid mechanically engineer the surface profile of the membrane to achieve a mixing pattern for the fluids passing over the membrane that maximizes the frequency with which fresh fluids contact the membrane surface. Appropriate engineering of the surfaces of rollers 30, 32 assures the desired result.

The forming of the corrugations also seems the side edges of the composite preventing separation of the component layers after the composite is withdrawn from the corrugating rollers. To ensure non-separation of the layers, double backed tape or pressure sensitive adhesive may be applied upon the interior surfaces of the foil layers at the side borders.

Returning to FIG. 2, following the corrugation procedure, the composite is operated upon to set the membrane 10 in its reshaped condition. The composite is placed between two grooved or corrugated plates 34, 36 which extends across the full width and the full length of the composite. The corrugations on the facing surfaces of plates 34, 36 correspond to the corrugations on the outer surfaces of respective composite layers 12, 14. The plates 34, 36 are placed under moderate pressure by biasing means 38 such as weights or springs to press them against the composite. Heating means 42 heat the plates 34, 36. With a PTFE membrane 10 and metal foil layers 12, 14, the plates are raised to a temperature in the range of 300°–350° C. and are held at this temperature for a minimum of 30 seconds. The metal foil layers 12, 14 transmit the heat to the PTFE layer 10 and cause it to become heat set in its corrugated condition.

In a modification of the above procedure, the plates 34, 36 may be flat. However, if the foil layers 12, 14 are fully annealed or are quite thin, i.e. down to 0.5 mm., the corrugated PTFE layer may collapse and lose some of its corrugated shaping under moderate pressure and heat applied by plates 34, 36. To avoid this loss of shape, in place of flat plates, fluted or corrugated plates 34, 36 are preferred.

Alternate heat setting techniques for the corrugated composite include continuous feeding of sections of the composite from the corrugator into a heated gap between plates, or feeding specific lengths of the composite into cartridges that are formed by spring loaded or weight loaded plates, which cartridges then may be subsequently heated singularly or in a group in a simple air circulating oven. The latter cartridge concept has an additional benefit in that the loaded plates of the cartridge hold the three layers of the composite accurately and securely together, thereby eliminating the need for crimping the borders of one of the layers or otherwise adhering the layers together, which crimping or adhering steps are usually provided for keeping the composite from prematurely separating.

In certain applications, it may be desirable for ultimate sealing of the crimped PTFE layer between support plates that its borders be flat or unpleated and thus act as a gasket. In conjunction with the heat forming step, a separate plate (not shown) or a specially shaped portion (not shown) of the basic heating plate may engage the borders of the composite layer and apply pressure thereto under heat to reform the same into a flat or otherwise desired shape. A suitable heat and pressure applying die may also be provided for this purpose.

Following heat setting, the next step is to quench or to permit the composite to cool. This is often done while the composite is between plates 34, 36 so that the membrane 10 retains its shape. Thereafter, the foil layers 12, 14 are cut and peeled away from the PTFE membrane 10, leaving the permanently corrugated PTFE membrane 10 for its desired applications. The heat set shape is permanent unless the PTFE membrane is reheated to a minimum of 250° C.

Uses for corrugated membranes in general, for porous membranes in particular and more particularly for unexpanded porous PTFE membranes are virtually unlimited. The principal application of a precisely shaped membrane produced in accordance with the invention is in equipment that transfers fluids or energy across a selective barrier, i.e. the membrane, and wherein the fluid mechanics induced by the profiled surface of the membrane must be very efficient to achieve the maximum intrinsically high transfer potential of the barrier across a confined span. For example, precisely shaped selective membranes may be used in blood oxygenators, kidney dialysis machines, filters and heat transfer devices. One particular application for corrugated PTFE membranes is described in two publications: "A High Efficiency Membrane Oxygenator, et al.", by B. J. Bellhouse, et al., XIX Trans. Amer. Soc. Artif. Int. Organs (1973), p. 72; and "Prolonged Pulmonary Support of New-Born Lambs with the Oxford Membrane Oxygenator", by J. M. Nelems, et al., XX Trans. Amer. Soc. Artif. Int. Organs (1974), p. 293.

FIG. 3 herein is a schematic cross section through an oxygenator 50 of the type disclosed in the above publications and employing membranes made in accordance with the process of the invention. The oxygenator is comprised of stainless steel latticework supports 52, 54, which support respective porous PTFE membranes, 56, 58. Membranes 56, 58 were set in the illustrated corrugated form by the method set forth herein. The individual corrugations are 2 mm. in width and extend the full length of the membranes (perpendicular to the plane of the drawing of FIG. 3).

Each corrugation or furrow in each membrane is 0.5 mm. in depth. The minimum spacing between membranes 56, 58 is 0.4 mm. Such design and spacing combines good vortex mixing of the blood with low blood flow resistance.

In the oxygenator, oxygen passes between the stainless steel latticework elements and in a direction that is perpendicular to the plane of drawing FIG. 3. Blood to be oxygenated enters the oxygenator through inlet 62 and exits through outlet 64. Inlet and outlet pumps (not shown) pump the blood from the inlet 62 through the outlet 64. The corrugated shape of the membranes 56, 58 create a plurality of chambers 66. The passage of blood creates vortices in these chambers which assist in blood oxygenation. The blood circulating through the chambers 66 is oxygenated by oxygen premeating through the membranes 56, 58. The corrugated shaping of the membranes 56, 58 also causes them to have a greater surface area between inlet 62 and outlet 64 that is exposed to blood and through which the oxygen can permeate, thereby ensuring that sufficient oxygen enters the blood being oxygenated.

Although a preferred embodiment of a method for forming a corrugated plastic, and particularly PTFE, membrane has been disclosed and a particular application for such membrane has been disclosed, it is to be understood that various modifications of the method disclosed herein, of the materials used for the membrane, of the external supporting layers and of the uses and applications for a membrane formed in accordance with the invention are apparent to persons skilled in the art. Accordingly, this invention is not limited by the disclosure herein, but only by the appended claims.

I claim:

1. A method for shaping a plastic membrane, comprising the steps of:
    placing the membrane between two covering layers, thereby forming a three layer composite;
    applying forces to the composite to reshape it; and
    setting the reshaped membrane to cause it to retain its new shape while it remains part of the composite.

2. The method for shaping a plastic membrane of claim 1, wherein the covering layers are comprised of metal.

3. The method for shaping a plastic membrane of claim 1, comprising the further step, after setting of the reshaped membrane, of removing the covering layers.

4. The method for shaping a plastic membrane of claim 1, wherein the step of setting the reshaped membrane comprises applying heat thereto, thereby to heat set it in the desired shape.

5. The method for shaping a plastic membrane of claim 4, wherein the membrane is comprised of PTFE and the heating step comprises applying heat at a temperature in the range of 300°–350° C. for a period of at least 30 seconds.

6. The method for shaping a plastic membrane of claim 4, wherein the covering layers are comprised of metal.

7. The method for shaping a plastic membrane of claim 6, wherein the membrane is comprised of PTFE and the heating step comprises applying heat at a temperature in the range of 300°–350° C. for a period of at least 30 seconds.

8. The method for shaping a plastic membrane of claim 4, wherein simultaneously with the application of heat, surface pressure is applied to the outer surfaces of the covering layers.

9. The method for shaping a plastic membrane of claim 1, comprising the further step, after placing the membrane between the two covering layers, of securing the three layer composite, comprised of the two covering layers and the membrane, together against relative movement.

10. The method for shaping a plastic membrane of claim 9, wherein the securing step comprises folding one covering layer around and past the membrane and then crimping the one covering layer against the other covering layer.

11. A method for shaping a plastic membrane, comprising the steps of:
    placing the membrane between two metallic covering layers, thereby forming a three layer composite;
    securing the three layer composite, together against relative movement;
    applying forces to the composite to reshape the entire composite;
    applying heat to the composite at a temperature and for a period of time sufficient to heat set the membrane into the shape it has in the reshaped composite and while heating the composite, also applying surface pressure to the outer surfaces of the covering layers;
    cooling the heated composite; and
    removing the covering layers.

12. The method for shaping a plastic membrane of claim 11, wherein the membrane is comprised of PTFE and the heating step comprises applying heat at a temperature in the range of 300°–350° C. for a period of at least 30 seconds.

13. The method for shaping a plastic membrane of claim 11, wherein the step of applying forces to the composite to reshape it comprises altering the surface profile of the composite including the membrane within it across the entire width of the composite.

* * * * *

UNITED STATES PATENT AND TRADEMARK OFFICE
CERTIFICATE OF CORRECTION

PATENT NO. : 4,108,938
DATED : August 22, 1978
INVENTOR(S) : Solomon Rosenblatt

It is certified that error appears in the above-identified patent and that said Letters Patent are hereby corrected as shown below:

```
Column 3, Line 42, "EMBOCIMENT" should be -- EMBODIMENT --.
Column 5, Line 15, "10. it is" should be -- 10.  It is --.
Column 7, Line 1, "premeating" should be -- permeating --.
Column 7, Line 20, after "a" and before "plastic", insert
   -- thin --; after "membrane," and before "com-", insert
   -- subject to tear or rupture, --.
Column 7, Line 24, after "and", insert -- transferring said
   membrane to a station for setting the reshaped membrane
   and --.
Column 7, Line 25, after "membrane" and before "to", insert
   -- at the station --.
Column 8, Line 19, after "a" and before "plastic", insert
   -- thin --; after "membrane" and before "com-", insert
   -- subject to tear or rupture, --.
Column 8, Line 27, after "composite;", insert -- transferring
   the reshaped composite to a setting station for setting the
   reshaped composite and at the setting station, --.
```

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*